Nov. 8, 1932.  G. B. LAKE  1,886,698

MILK BOTTLE

Filed April 26, 1929

GEORGE B. LAKE, INVENTOR

BY Victor J. Evans, ATTORNEY

WITNESS:

Patented Nov. 8, 1932

1,886,698

UNITED STATES PATENT OFFICE

GEORGE B. LAKE, OF NEW BRUNSWICK, NEW JERSEY

MILK BOTTLE

Application filed April 26, 1929. Serial No. 358,324.

This invention relates to improvements in milk bottles.

The primary object of the invention is to construct a milk bottle of inexpensive bendable material which, after having been used once, may be discarded, thus obviating the necessity of collecting empty bottles and washing of the same, as has heretofore been done by milk dealers.

Another object of the invention is the provision of a bottle in which the fluid content may be carried in fibrous material which will withstand the strain of rough usage, such as milk bottles are subjected to during ordinary transit and delivery.

A further object of the invention is to provide a bottle with a strong and appropriate neck section for facilitating manipulation of the same while in contact with others, without risk of injury to the contacting parts. The rigid neck is detachably connected to the body portion for separation of these parts after the contents of the bottle have been removed.

A still further object of the invention is to provide a milk bottle with a fibrous body which may be placed in contact with others during carriage without danger of the same being broken, thereby dispensing with the necessity of using cumbersome crates with a separate section for each bottle.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
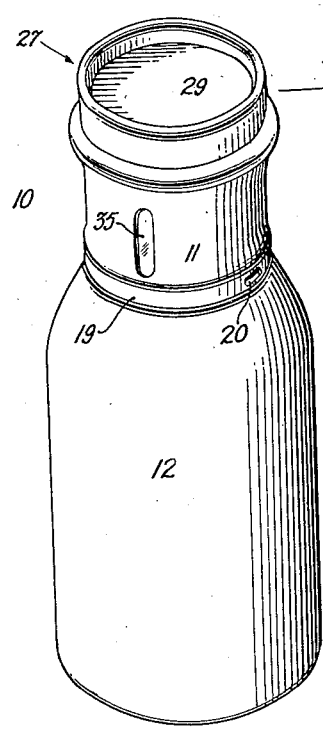
Figure 1 is a perspective view of my improved milk bottle.
Figure 4:
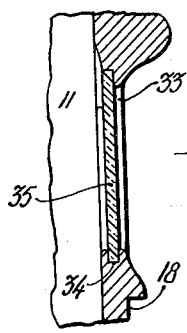
Figure 4 is a detail sectional view on the line 4—4 of Figure 2.
Figure 2:
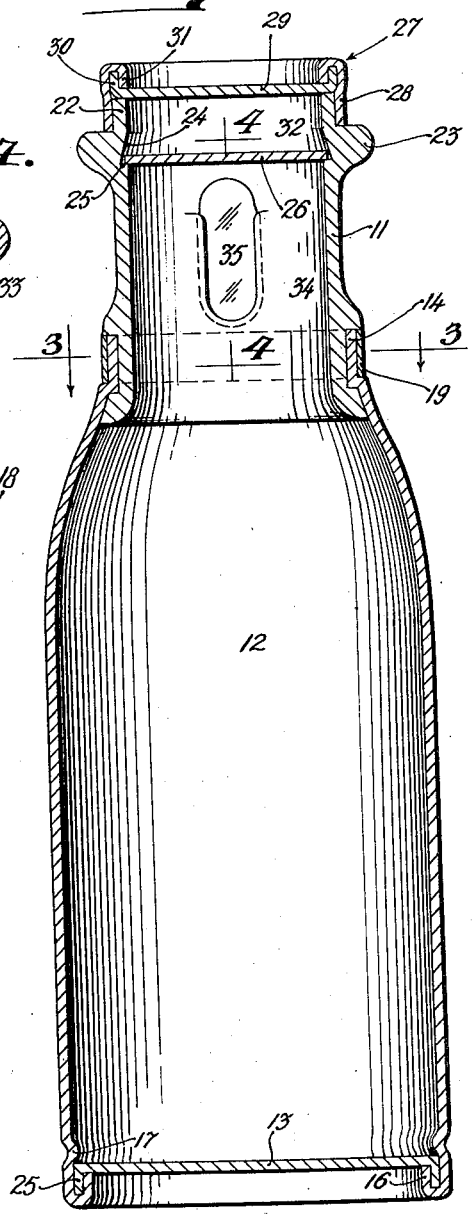
Figure 2 is a vertical sectional view of the same.
Figure 3:
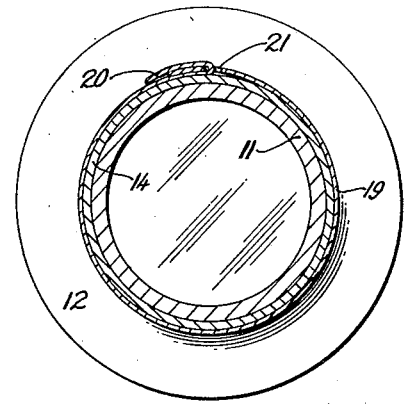
Figure 3 is a horizontal sectional view on the line 3—3 of Figure 2.

Referring particularly to the drawing by reference characters, the numeral 10 designates my milk bottle in its entirety, which includes a neck section 11 of rust-proof metal, glass, celluloid or other rigid material, and a hollow cylindrical body section 12 of paper or other fibrous material, which may be about one sixteenth of an inch in thickness.

This body comprises a bottom 13 at one end thereof and at the opposite end a portion 14 of reduced diameter to accommodate the inner end of the neck section, in a manner to be hereinafter described. The bottom 13 is formed, at right angles to its disc, with a downwardly turned flange 25, while the end of the cylinder 12 is turned inwardly, and upwardly at 16, to form an annular recess which receives the flange 25 in sealed watertight engagement, there being a rib 17 on the side wall of the body to limit the inward movement of the bottom on insertion of the same. Owing to its transverse disposition, and to the reinforcing effect of its associated flanges, the bottom 13, which may be of the same material as that of the body 12, is practically rigid.

The inner end of the neck 11 is formed with a peripheral groove 18 in which the reduced portion 14 fits. In order to secure proper engagement of the latter in its groove, I prefer to utilize a metallic clamp or binding strap 19, one end of which terminates in a reduced bendable tongue 20, while the other end of the strap is provided with a slot 21 to receive said tongue.

The neck 11 is formed adjacent its outer end 22 with a circumferential bead 23, which is useful as a gripping surface, and also as a means of reinforcing the neck, the inner side of the wall of which is beveled at 24 to provide a ledge 25 as a seat for the top or stopper 26 of the bottle. On inserting this disc, which is of yieldable material, the same may be cambered or moved obliquely until its edge reaches the seat 25 whereon the disc rests in flat condition. Any pointed article may be used to remove said disc.

In order to preserve in a sanitary condition the inner face of the neck of the bottle, between the stopper and the end 22, an end closure cap 27 is provided. This cap, comprising an outer skirt or flange 28, which airtightly engages the end 22 of the bottle, is provided with a disc 29, the flange 30 of which is embraced by a mating inturned flange 31 of said skirt. It will therefore be seen that an air compartment 32 is provided between the discs 29 and 26; and any tendency to displace the latter disc, by reason of an impact received by the body of the bottle during transit, will be pneumatically offset by reciprocating pressure in said compartment. Instead of being fragile, as in the case of a glass bottle, the wall 12 is therefore resilient.

As the materials of the bottle are opaque and as it is sometimes desirable, as when carrying milk which accumulates cream, to view the contents of a bottle, I provide an opening 33 in the neck 11. The opening is traversed on three of its sides by a groove 34 in which a strip of transparent material 35, such as celluloid is sealed.

Treating the fibrous materials of the bottle with wax or other appropriate substance renders the same moisture proof. A neck 11 may, of course, be used any number of times.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed to be new is:—

1. A bottle comprising a body having a practically rigid bottom within one end thereof, a yieldable portion of reduced diameter at the other end of said body, a rigid tubular neck having an internal annular ledge at one end thereof, the opposite end of said neck having a peripheral groove therein, the reduced end of said body seated in said groove, and means for removably holding said reduced portion in its groove.

2. A sanitary bottle comprising a body of fibrous material open at one end, a neck engaged in said open end, means for detachably connecting the neck with said open end, the neck having a bead adjacent to but inset from that end engaged with the body, and a removable cap fitting over the projecting end of the neck and frictionally engaged therewith.

In testimony whereof I have affixed my signature.

GEORGE B. LAKE.